Patented July 9, 1946

2,403,656

UNITED STATES PATENT OFFICE 2,403,656

INCENDIARY WITH HIGH PENETRATING POWER

Albert Grobstein, Washington, D. C.

No Drawing. Application July 23, 1942,
Serial No. 452,079

6 Claims. (Cl. 44—3)

This invention relates to a novel incendiary and pyrotechnic material, useful in incendiary bombs and compositions, thermit mixtures, pyrotechnic compositions, and the like. The invention is particularly useful in connection with incendiary bombs of the magnesium type which develop high incendiary temperatures. The invention comprises the use of a fusible penetrating nitride, preferably lithium nitride ($Li_3N$), as an essential element in the aforesaid compositions, or for use in connection therewith as an auxiliary material.

Lithium nitride ($Li_3N$) may be prepared by gradually heating lithium to dull redness in a current of nitrogen. It may also be prepared by other methods such as, for example, the heating of a lithium analgam to 600° C. in an atmosphere of nitrogen. The lithium nitride may be prepared by any of the available methods given in the literature.

The present invention utilizes in a magnesium incendiary bomb, a quantity of encapsulated lithium nitride so that upon the intense generation of heat resulting from the oxidation or burning of magnesium or of a thermit mixture, the lithium nitride will become fused and thus penetrate any desired structure upon which the bomb is dropped.

Lithium nitride ($Li_3N$) has a melting point of from 840° to 845° C. At 870° C., it is corrosively penetrating of metallic and refractory structures.

Any of the usual thermit compositions may be used in conjunction with lithium nitride, for example, those that are described in the original Goldschmidt Patent 578,868, or other known compositions in the art. One such composition shown in the prior art is powdered aluminum 3 parts, barium nitrate 6 parts, and hammer-scale 8 parts. Any igniter composition may be used in connection with the thermit, said igniter composition ordinarily being ignited by a percussion fuse. One of the described igniter compositions in the art is a mixture of barium peroxide and aluminum.

The specific thermit mixture or igniter composition forms no part of this invention, the only requirement being that these substances generate sufficient heat to fuse the lithium nitride that is used in conjunction therewith so that it forms a penetrating, hot corrosive agent when it becomes fused.

The lithium nitride may be arranged in a separate compartment of any conventional incendiary bomb, preferably out of contact with the air as moisture reacts therewith to form ammonia and lithium hydroxide, and possibly hydrogen. The lithium nitride may be utilized as a lining material for the chamber in which the thermit is contained, and preferably protected so that it fuses before it oxidizes. It may be used as inserts at various places in the shell of the bomb, and thus made fusible with the body of magnesium alloy.

While lithium nitride is the preferred composition for use as aforesaid, other nitrides may be used in combination therewith. Cerium nitride ($CeN$), potassium nitride ($K_3N$), calcium nitride ($Ca_3N_2$), and lanthanum nitride ($LaN$) may be mentioned.

The aforesaid nitrides when heated in air usually burn with incandescence and react violently with water. Accordingly, the use of water in spraying these compositions for civilian defense is attended with danger.

What I claim:

1. An incendiary, or thermit bomb containing as essential elements the combination of at least one of the group consisting of the nitrides of lithium, cerium, potassium, calcium, and lanthanum, and a heating agent adapted to fuse the same.

2. A magnesium incendiary bomb containing a thermit mixture and an essential quantity of lithium nitride segregated from said mixture and adapted to be fused by generated heat.

3. An incendiary or thermit composition comprising lithium nitride as an essential ingredient and a heating agent adapted to fuse the lithium nitride.

4. An incendiary or thermit composition comprising an essential quantity of an alkali metal nitride which is penetrative and corrosive of other materials in its fused state, and a heating agent adapted to fuse the nitride.

5. An incendiary or thermit composition containing as an essential ingredient at least one of the group consisting of the nitrides of lithium, cerium, potassium, calcium, and lanthanum, and a heating agent adapted to fuse the same.

6. An incendiary or thermit device containing a quantity of encapsulated lithium nitride and a heat producing material adapted to fuse the same.

ALBERT GROBSTEIN.